U S008037811B2

(12) United States Patent
Bunn

(10) Patent No.: US 8,037,811 B2
(45) Date of Patent: Oct. 18, 2011

(54) ADJUSTABLE VOLUME BREWER

(75) Inventor: Arthur Bunn, Springfield, IL (US)

(73) Assignee: Bunn-O-Matic, Springfield, IL (US)

( * ) Notice: Subject to any disclaimer, the term of this patent is extended or adjusted under 35 U.S.C. 154(b) by 1069 days.

(21) Appl. No.: 10/595,716

(22) PCT Filed: Nov. 5, 2004

(86) PCT No.: PCT/US2004/037106
§ 371 (c)(1),
(2), (4) Date: Dec. 22, 2006

(87) PCT Pub. No.: WO2005/046408
PCT Pub. Date: May 26, 2005

(65) Prior Publication Data
US 2007/0157820 A1 Jul. 12, 2007

Related U.S. Application Data

(60) Provisional application No. 60/518,039, filed on Nov. 7, 2003.

(51) Int. Cl.
*A47J 31/00* (2006.01)
(52) U.S. Cl. ................. 99/280; 99/282; 99/283; 99/305
(58) Field of Classification Search .................... 99/280, 99/281, 282, 283, 295, 302 R, 305
See application file for complete search history.

(56) References Cited

U.S. PATENT DOCUMENTS 4,426,919 A * 1/1984 Rhoten ......................... 99/289 T
5,647,055 A 7/1997 Knepler
5,836,236 A 11/1998 Rolfes et al.
5,953,981 A 9/1999 Lassota
5,975,365 A 11/1999 Hsieh
6,003,435 A 12/1999 Patel
(Continued)

FOREIGN PATENT DOCUMENTS
DE 29814318 U1 12/1998
(Continued)

OTHER PUBLICATIONS
Search report issued in application No. EP04800857 (2010).

*Primary Examiner* — Reginald L Alexander
(74) *Attorney, Agent, or Firm* — Barnes & Thornburg LLP

(57) ABSTRACT

Beverage making apparatus which controllably produces a beverage from a brewing substance by combining heated water with a brewing substance. The beverage making apparatus includes a volume adjustment assembly (22) which can be controlled by a user to increase or decrease the volume of water which is controllably dispensed to the beverage making substance. The apparatus and method for using the apparatus includes controllably dispensing water from a water source such as a water reservoir (34) or pressurized water line to a controllable heated water reservoir (53). The heated water reservoir communicates with the spray head (40). A flow meter (46) is provided and communicates with a water dispensing line (38) between the water source and the heated water reservoir for monitoring the volume of water flowing through the dispensing line. A controller (28) associated with the beverage making apparatus is coupled to the devices and controllably monitors water flowing through the dispensing line by use of the flow meter. During operation the volume adjustment assembly can be controlled to increase the volume of water which is permitted to flow from the water source to the spray head and may be controlled to decrease the volume of water.

17 Claims, 2 Drawing Sheets

U.S. PATENT DOCUMENTS

| | | |
|---|---|---|
| 6,439,105 B1 | 8/2002 | Ford |
| 6,612,224 B2 | 9/2003 | Mercier et al. |
| 6,763,759 B2 * | 7/2004 | Denisart ................... 99/302 P |
| 7,021,197 B2 * | 4/2006 | Chen et al. ................... 99/291 |
| 2002/0129712 A1 * | 9/2002 | Westbrook et al. ............ 99/279 |
| 2003/0066431 A1 * | 4/2003 | Fanzutti et al. ............... 99/279 |
| 2004/0055473 A1 * | 3/2004 | Stoner ........................... 99/295 |
| 2005/0160918 A1 * | 7/2005 | Winstanley et al. ........... 99/279 |
| 2005/0188854 A1 * | 9/2005 | Green et al. ................... 99/275 |

FOREIGN PATENT DOCUMENTS

EP 1354543 10/2003

* cited by examiner

ADJUSTABLE VOLUME BREWER

BACKGROUND

A variety of brewing apparatus have been developed to combine heated water with a brewing substance such as ground coffee or tea material in order to infuse the material and produce a brewed beverage. There are many ways to combine the water with the brewing substance. One way is to place the substance in a filter device such as a disposable filter paper and place the filter paper and brewing substance in a brewing funnel or basket. The water is mixed with the brewing substance in the filter thereby allowing the brewed substance to filter through the paper leaving the saturated brewing substance in the filter paper. The saturated substance and used filter paper can be thrown away.

Another way of brewing beverage is to encapsulate the brewing substance in a filter material or filter device The brewing substance in the filter material provides a convenient package for handling a predetermined quantity of brewing substance. The filter material provides a package or container for the brewing substance. This package allows the brewing substance to be handled prior to brewing and after brewing without complication or mess.

Such brewing substances pre-packaged in filter material are referred to as "pods" or "sachets." Pods can be compressed while packaging in the filter material or left in a generally loose condition. Pods are generally shaped in a circular shape having a generally flattened configuration. The pods often are provided in the shape of a disc or puck. Pods generally range in a size from approximately 45-60 mm and contain approximately 9-10 grams of brewing substance. The typical pod is used to produce approximately 8 ounces of brewed beverage.

It is desirable to improve the flavor and extraction of the flavors and other components of the coffee or other brewing substances. When brewing a beverage it is desirable to saturate, penetrate, agitate and otherwise engage all of the particles of the brewing substance so as to thoroughly wash from the brewing substance all of the desirable flavor characteristics and substances for incorporation into the brewed beverage.

When brewing a beverage it may be desirable to increase the volume of the resultant beverage or alter the strength of the beverage. In this regard, it is necessary to increase or decrease the quantity of brewing water which is delivered to the brewing substance. Of course, decreasing the quantity of brewing water will also decrease the quantity of resultant beverage. Depending on the brewing substance alteration of the brew water volume may also alter the concentration of solubles which are extracted from the brewing substance. For example, by using a smaller volume of brewing liquid only the initial flavor characteristics will be washed from the brewing substance. For example, with coffee, the initial portion of brewing water used to produce brewed coffee may extract the initial flavor characteristics while continued brewing may develop additional oils and flavor characteristics which are more deeply embedded in the cell structure of the coffee bean material. It has been found that the increase in the proportion of ground coffee to water may increase the richness of the brewed coffee. Similarly, decreasing the quantity of water for a given quantity of ground coffee may achieve similar changes.

It would be desirable to provide the ability to adjust the quantity of water dispensed over a predetermined quantity of ground coffee to alter the volume of resulting beverage or flavor of the resulting beverage.

DESCRIPTION OF THE DRAWINGS

The organization and manner of the structure and function of the disclosure, together with the further objects and advantages thereof, may be understood by reference to the following description taken in connection with the accompanying drawings, and in which.

DETAILED DESCRIPTION

Figure 1:
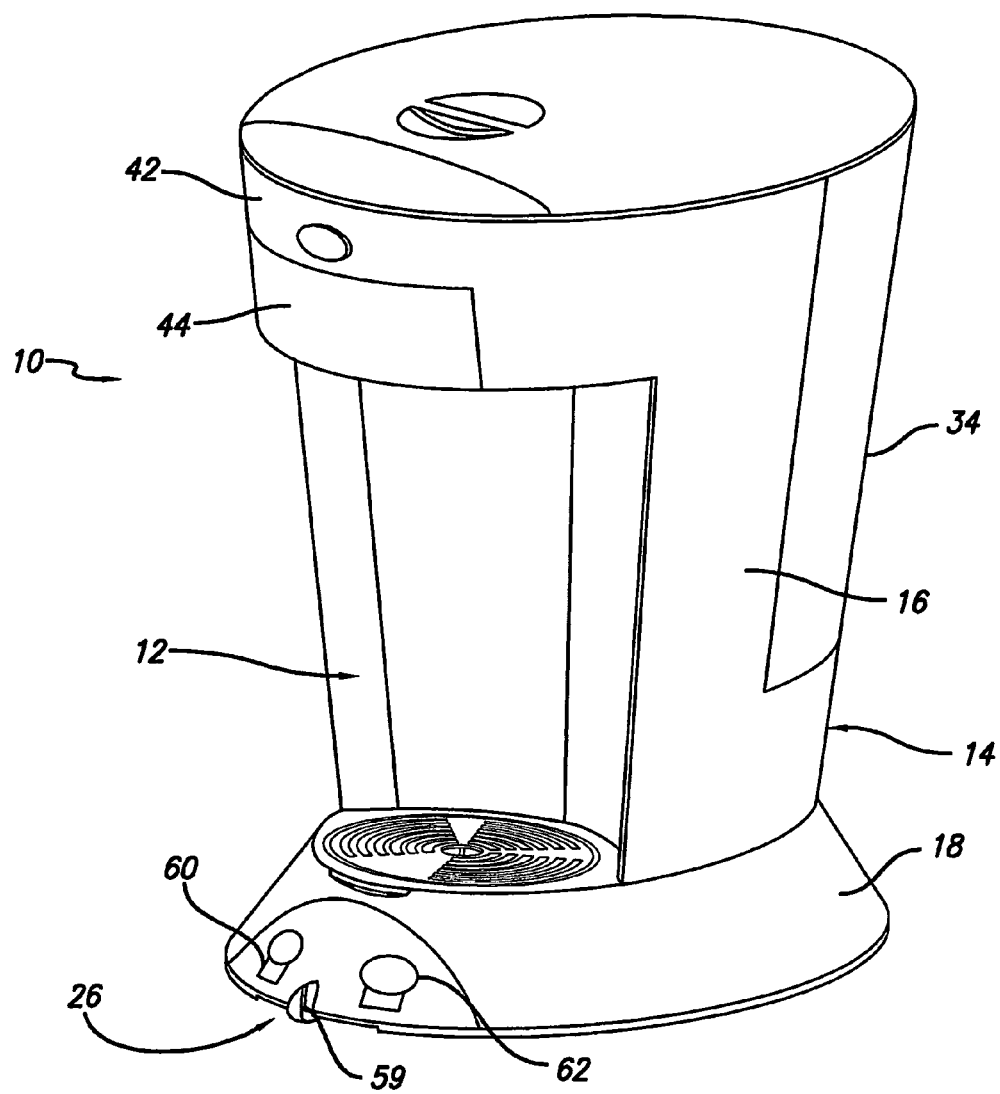
FIG. 1 shows a perspective view of a beverage brewing apparatus which includes an adjustment control assembly.

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

With reference to FIG. 1, a brewer 10 is illustrated. The brewer includes a dispensing area 12 for placement of a container such as a cup or other vessel for collecting a brewed substance. The brewer includes a housing 14 having an upper housing portion 16 and a base 18. It should be noted that the brewer 10 could take any of many different appearances or housing designs and still be within the scope of the present disclosure. The disclosure, as will be discussed in greater detail herein below, includes an adjustment control assembly for use with a brewer.

Terms including brew, brewer, beverage and beverage making as used herein are intended to be broadly defined as including but not limited to the brewing of coffee, tea and any other brewed beverage. This broad interpretation is also intended to include, but is not limited to any process of infusing, steeping, reconstituting, diluting, dissolving, saturating or passing a liquid through or otherwise mixing or combining a beverage substance with a liquid such as water without a limitation to the temperature of such liquid unless specified. This broad interpretation is also intended to include, but is not limited to beverage substances such as ground coffee, tea, liquid beverage concentrate, powdered beverage concentrate, freeze dried coffee or other beverage concentrates, to obtain a desired beverage or other food.

Figure 2:
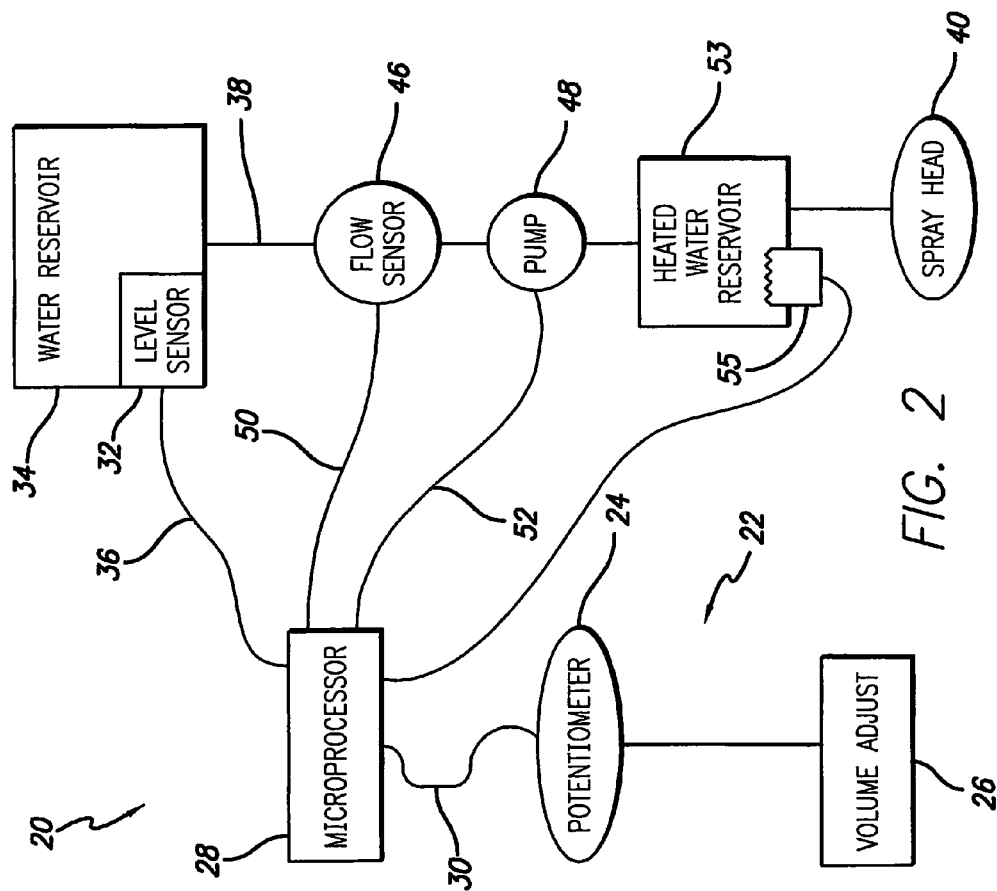
FIG. 2 is a general diagrammatic illustration of components used to facilitate adjustment of the volume of water used to produce a brewed beverage.

With reference to FIG. 2, an adjustment control assembly 20 is generally, diagrammatically illustrated. As shown, the adjustment control assembly 20 includes components associated with the brewer. The adjustment control assembly includes a volume adjustment assembly 22 including a controllable electronic adjustment device 24 such as a potentiometer. Coupled to the potentiometer is a volume adjustment interface 26 which facilitates control by a user.

The volume control 22 is coupled to a microprocessor or controller 28 over line 30. The microprocessor, in turn, is coupled to a level sensor 32 operatively associated with a water source shown as a reservoir 34. The water source might also be a pressurized water line communicating with a water dispensing line 38. The microprocessor 28 is coupled to the level sensor 32 over line 36. The water dispensing line 38 communicates with the water source for transporting water from the water source to a sprayhead 40. The adjustment control assembly 20 is generally housed within or carried on the brewer 10 with the water reservoir 34 being carried in or associated with the housing 14. The sprayhead 40 is contained in an upper portion 42 of the housing 16 for dispensing water to a brewing substance contained in a brewing substance compartment 44 of the brewer 10.

A flow sensor 46 and a pump 48 communicate with the water dispensing line 38. Water flowing from the water source 34 must pass through the flow sensor 46 and is moved by the pump 48 to a heated water reservoir 53 for dispensing to the sprayhead 40. The pump provides a level of pressurization of the water flowing from the reservoir 34 to the heated water reservoir and sprayhead 40. In use, the water reservoir 34 retains water for use in brewing. When brew water is to be dispensed it flows through line 38 to the flow sensor 46. The flow sensor is coupled to the microprocessor or controller by line 50 thereby providing information as to the volume of water passing through the flow sensor 46. The microprocessor operates the pump 48 by communication over line 52. The pump 48 pumps water into the heated water reservoir 53. The heated water reservoir 53 includes a heating device 55 coupled to the controller 28 over line 57. The controller 28 controllably operates the heater 55 to heat water pumped into the reservoir 53 for use in brewing. The pump is operated for a predetermined period of time based on the volume pumped per operation of the pump to dispense a predetermined volume of water to the heated water reservoir 53 which delivers water to the sprayhead 40.

Additionally, in the pressurized water line embodiment, the pressurized water line provides the force to move water to the heated water reservoir 53. A controllable valve on the pressurized water line is coupled to the controller 28 which controls the volume of water dispensed through the line 38 based on information from the flow meter 46.

The coupling of the level sensor, flow sensor and pump to the controller 28 along with the volume control 22 allows a user to use the volume adjustment device 26 to modify or otherwise control the volume of water that is dispensed from the water reservoir 34 to the sprayhead 40. The user operates the volume control 22 to increase or decrease the volume of water which is dispensed to the sprayhead 40 thereby increasing or decreasing the volume of water that is mixed with the brewing substance. The resultant beverage volume will be increased or decreased depending on the users control of the volume control 22. The increase or decrease of the volume of water dispensed at the sprayhead 40 over the brewing substance will change the flavor of the resultant beverage. Additionally, it is envisioned that the brewer 10 will be used with a pod form of brewing substance. As there can be variations in the flavors associated with different pods it is desirable to provide the ability to adjust the volume of water dispensed to achieve a desired resultant beverage flavor.

In the embodiment as shown in FIGS. 1 and 2 the volume adjustment interface 26 is shown as a control knob. The control knob is slideable left and right to increase or decrease the brew water volume. The knob can be used to switch between a large cup or a small cup, may be provided with specific target indicia, or may provide a generally continuous range from a predetermined low volume to a predetermined high volume. For example, a predetermined low volume may result in approximately 4 ounces of water being dispensed over the brewing substance whereas a predetermined high volume may result in approximately 12 ounces being dispensed over a brewing substance. It is envisioned that this adjustment can be tuned to the type of application with which the brewer will be used. For example, the range of volumes mentioned above may related to a "single cup" brewing system. In this regard, a predetermined low range may be approximately 4 ounces which is generally equivalent to a demitasse cup. Whereas a predetermined high volume may relate to a mug or thermal travel cup.

In one embodiment the volume adjustment interface provides a generally continuous selection so as to satisfy user expectations. In this regard, if discreet points or volumes were identified on the control the user may believe that a repair is required to the machine if the machine does not provide close to or precisely the target volume. It should be noted that this type of machine while being rather accurate, may not provide extremely high levels of water dispensing accuracy as there may be variations in the pump operation, flow sensor, water quantity, or impediments in the water line 38 or associated components. As such, in this type of setting a generally continuous range may be more desirable.

Additionally, the volume adjustment interface may be provided in any one of many forms. For example, while a sliding adjustment lever 59 is shown in FIG. 1 it is envisioned that some form of control knob or other control device may be used. Additionally, a dial may be incorporated as well as, perhaps, a touch screen panel. It is envisioned that indicia 60, 62 is provided. The indicia will indicate a cup size, a sliding scale, dots indicating small size to large size or any other combination for display, such as LED or LCD, which might be used to communicate to the user the volume which the have selected for their brewing operation.

Figure 3:
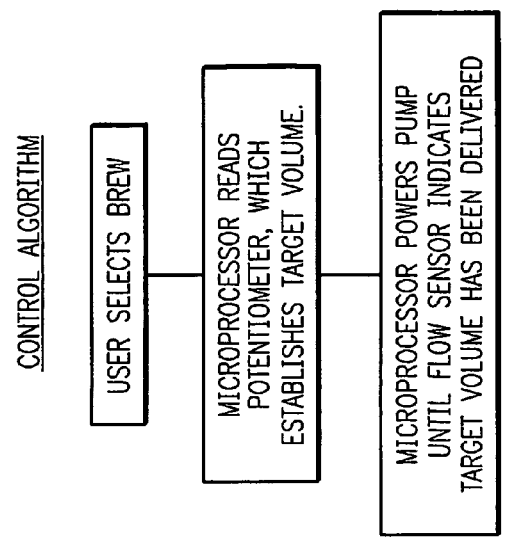
FIG. 3 is a general diagrammatic illustration of steps associated with a control algorithm of the present disclosure.

In use, with reference to FIG. 3, a user selects the brew volume to be used in the brewing operation. The microprocessor or controller 28 reads the value on the adjustment device 24 which is selected by the user using the volume adjustment interface 26. The selection by the user is the target volume of water to be used in the brewing process. The microprocessor communicates to the pump to operate the pump 48 until the flow sensor 46 indicates a target volume has been delivered through the line 38 to the sprayhead 40. The level sensor 32 will be used to provide information to the controller as to whether a sufficient volume of water is retained in the reservoir 34 for the brewing operation.

Further details of the configuration and operation of the single-serving brewer 20 can be found in related provisional applications entitled "Apparatus, System and Method for Infusing a Pre-Packaged Pod", provisional application No. 60/543,370, filed Feb. 9, 2004, "Apparatus System and Method for Retaining Beverage Brewing Substance", provisional application No. 60/542,433, filed Feb. 6, 2004, and "Brewer", design Pat. No. D511922, filed Feb. 10, 2004. Additional information related to a spray head system and method for delivering water to the brewing assembly of the single-serving brewer 20 can be found in U.S. Provisional Application entitled "Water Delivery System, Method and Apparatus" filed Nov. 7, 2003, U.S. Provisional Application No. 60/518,411. Additional information related to beverage making apparatus which uses loose coffee and related devices and methods of use can be found in U.S. Provisional Application entitled "A Beverage Making Apparatus and Method Using Loose Beverage Substances" filed Apr. 2, 2004, U.S. Provisional Application No. 60/560,033. Information about a pod holder with a removable insert can be found in U.S. Provisional Application entitled "Pod Holder with Removable Insert" filed May 28, 2004, U.S. Provisional Application No. 60/575,235. Information about a beverage making apparatus which uses loose coffee and related devices and methods of use can be found in U.S. Provisional Application entitled "A Beverage Making Apparatus and Method Using Loose Beverage Substance" filed Sep. 1, 2004, U.S. Provisional Application No. 60/606,233. Each of the above-referenced applications and the materials set forth therein is incorporated herein by reference in its entirety.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the following claims.

I claim:

1. A beverage making apparatus for controllably producing a beverage from a beverage making substance by combining heated water with a beverage substance, the apparatus comprising:
   a controller;
   a controllable water source;
   a water dispensing line communicating with the water source;
   a flow meter communicating with the water dispensing line and coupled to the controller for monitoring the volume of water flowing through the water dispensing line;
   a controllable heated water reservoir communicating with the water dispensing line and coupled to the controller for controllably heating water for use in making beverages;
   a spray head communicating with the heated water reservoir; and
   a volume adjustment assembly coupled to the controller for selectively adjusting the volume of water dispensed from the spray head, the volume adjustment assembly including a potentiometer coupled to the controller.

2. A beverage making apparatus of claim 1, further comprising a controllable pump communicating with the water dispensing line and coupled to the controller for pumping water to the spray head.

3. A beverage making apparatus of claim 1, further comprising the water source being a pressurized water line communicating with the water line for providing water to the beverage making apparatus.

4. A beverage making apparatus of claim 1, further comprising the water source being a water reservoir communicating with the water line for providing water to the beverage making apparatus.

5. A beverage making apparatus of claim 4, further comprising a level sensor associated with the water reservoir and communicating with the controller for detecting the level of water in the reservoir.

6. A beverage making apparatus for controllably producing a beverage from a beverage making substance by combining heated water with a beverage substance, the apparatus comprising:
   a beverage making substance compartment for retaining a beverage making substance;
   a controller;
   a water source;
   a water dispensing line communicating with the water source;
   a flow meter associated with the water dispensing line and coupled to the controller for providing information to the controller corresponding to a volume of water flowing through the dispensing line;
   a controllable heated water reservoir communicating water dispensing line and coupled to the controller for controllably heating water for use in making beverages;
   a spray head communicating with the heated water reservoir and to deliver water to the brewing substance compartment;
   an user operable adjustment control assembly coupled to the controller for allowing a user to selectively adjusting the volume of water dispensed to the beverage making substance compartment, the user operable adjustment control assembly including a potentiometer coupled to the controller; and
   whereby the controller uses the information from the setting selected at the adjustment control assembly and monitors the information from the flow meter to facilitate dispensing of a volume of water to the beverage making substance compartment corresponding to the selection by the user at the adjustment control assembly.

7. A beverage making apparatus of claim 6, further comprising a controllable pump communicating with the water dispensing line and coupled to the controller for pumping water to the spray head.

8. A beverage making apparatus of claim 6, further comprising the water source being a pressurized water line communicating with the water line for providing water to the beverage making apparatus.

9. A beverage making apparatus of claim 6, further comprising the water source being a water reservoir communicating with the water line for providing water to the beverage making apparatus.

10. A beverage making apparatus of claim 9, further comprising a level sensor associated with the water reservoir and communicating with the controller for detecting the level of water in the reservoir.

11. A beverage making apparatus for controllably producing a beverage from a beverage making substance by combining water with a beverage substance, the apparatus comprising:
   a beverage making substance compartment for combining a beverage making substance with water to produce a beverage;
   a controller;
   a water source;
   a water dispensing line communicating with the water source;
   a flow control associated with the water dispensing line and coupled to the controller for controlling the flow of water to the beverage making substance compartment;
   a user operable variable adjustment control assembly coupled to the controller for allowing a user to selectively set a characteristic of the beverage produced by the apparatus;
   the user operable variable adjustment control assembly is coupled to a potentiometer communicating with the controller to provide a variable range of settings;
   whereby the controller uses the information from the setting selected at the user operable variable adjustment control assembly and monitors the information from the flow control to facilitate dispensing of a selected volume of water to the beverage making substance compartment to produce beverage corresponding to the selection by the user at the user operable variable adjustment control assembly; and wherein the characteristic controllable at the user operable variable adjustment control assembly corresponds to the volume of water dispensed to the beverage making substance compartment.

12. The beverage making apparatus of claim 11, wherein the characteristic controllable at the adjustment control assembly also corresponds to the flavor of the resultant beverage.

13. The beverage making apparatus of claim 11, wherein the characteristic controllable at the adjustment control assembly also corresponds to the darkness of the resultant beverage.

14. The beverage making apparatus of claim 11, wherein the sliding adjustment control of the adjustment control assembly shifts generally horizontally.

15. The beverage making apparatus of claim 11, wherein the adjustment control assembly is also generally positioned at a base of the apparatus.

16. The beverage making apparatus of claim 11, wherein the adjustment control assembly is also generally positioned at a base of the apparatus proximate to a dispensing area at which a container is positioned for receipt of beverage from the apparatus.

17. A beverage making apparatus for controllably producing a beverage from a beverage making substance by combining water with a beverage substance, the apparatus comprising:

a beverage making substance compartment for combining a beverage making substance with water to produce a beverage;

a controller;

a water source;

a water dispensing line communicating with the water source;

a flow control associated with the water dispensing line and coupled to the controller for controlling the flow of water to the beverage making substance compartment;

a user operable variable adjustment control assembly coupled to the controller for allowing a user to selectively set a characteristic of the beverage produced by the apparatus, the user operable variable adjustment control assembly is coupled to a potentiometer communicating with the controller to provide a variable range of characteristic settings;

whereby the controller uses the information from the setting selected at the variable adjustment control assembly and monitors the information from the flow control to facilitate dispensing of a selected volume of water to the beverage making substance compartment to produce beverage corresponding to the selection by the user at the variable adjustment control assembly; and wherein the variable adjustment control assembly includes a touch panel screen which can be operated to select at least one of the variable range of characteristics of the resultant beverage.

* * * * *